United States Patent [19]

Teubner et al.

[11] 4,451,649

[45] May 29, 1984

[54] PROCESS FOR THE PRODUCTION OF HYDROXYPROPYL STARCH

[75] Inventors: Helwig Teubner, Hanau; Wilhelm Oppermann, Bomlitz, both of Fed. Rep. of Germany

[73] Assignee: Wolff Walsrode Aktiengesellschaft, Walsrode, Fed. Rep. of Germany

[21] Appl. No.: 428,853

[22] Filed: Sep. 30, 1982

[30] Foreign Application Priority Data

Oct. 20, 1981 [DE] Fed. Rep. of Germany ....... 3141499

[51] Int. Cl.$^3$ .............................................. C08B 31/12
[52] U.S. Cl. ..................................... 536/111; 106/92; 106/111; 106/114; 106/210
[58] Field of Search ................... 536/111; 106/210, 92, 106/111, 114

[56] References Cited

U.S. PATENT DOCUMENTS

| | | | |
|---|---|---|---|
| 2,516,632 | 7/1950 | Kesler et al. | 536/111 |
| 2,516,633 | 7/1950 | Kesler et al. | 536/111 |
| 2,516,634 | 7/1950 | Kesler et al. | 536/111 |
| 2,733,238 | 1/1956 | Kerr et al. | 536/111 |
| 2,845,417 | 7/1958 | Kesler et al. | 536/111 |
| 3,033,853 | 5/1962 | Klug | 536/111 |
| 3,278,520 | 10/1966 | Klug | 536/95 |
| 3,378,546 | 4/1968 | Tsuzuki | 106/210 |
| 3,577,407 | 5/1971 | Hjermstad | 536/111 |
| 3,652,539 | 3/1972 | Miura et al. | 536/89 |
| 3,705,891 | 12/1972 | Tuschhoff et al. | 536/106 |

*Primary Examiner*—Ronald W. Griffin
*Attorney, Agent, or Firm*—Connolly and Hutz

[57] ABSTRACT

A process for the production of hydroxypropyl starch wherein the starch is etherified in the presence of a small amount of water with an excess of propylene oxide which hydroxypropyl starch is used as plaster additive.

5 Claims, No Drawings

PROCESS FOR THE PRODUCTION OF HYDROXYPROPYL STARCH

Hydroxypropyl starch (HPS), which is obtained by reacting starch with propylene oxide, is used together with cellulose ethers as a so-called set-up agent in the building industry. The addition of the set-up agent influences the rheology of a plaster and improves its processing properties. In particular, the addition of the set-up agent improves the stability of the plaster sprayed on and facilitates processing of the plaster and so-called slurry formation, i.e. the dissolving out and the uniform distribution of minute particles from the plaster applied.

Since the adhesion of the plaster, which is dependent upon the rate of dissolution of the HPS, is intended to increase quickly, the HPS added is highly effective as a set-up agent if thickening occurs after about 10 seconds. In addition to the development of thickening, another important factor is the stability of thickening, i.e. the high initial viscosity rapidly established must remain intact over a relatively long period of the order of 15 minutes.

Processes for the production of HPS are known. They are based on the so-called dry method in which starch is directly reacted with catalytic quantities of a base and the etherifying agent, propylene oxide, (U.S. Pat. Nos. 2,516,632, 2,516,633, 2,516,634 and 2,733,238). The degrees of molar substitution (MS) reached range from 0.05 to 1.5. However, the more advanced method is to carry out etherification in the presence of an inert solvent (U.S. Pat. No. 2,845,417), such as methanol, ethanol, isopropanol or mixtures thereof. Where this procedure is adopted, MS-values of from about 0.4 to 0.9 are reached (U.S. Pat. No. 3,652,539). A disadvantage of this method lies in the fact that the inert reaction medium has to be removed after etherification and the etherifying agent is often difficult to separate therefrom. In addition, the effect of the HPS thus produced may be inadequate.

The present invention provides a process for the production of hydroxypropyl starch having molar substitution degrees (MS) of at most 1, wherein the starch is etherified in the presence of a little water and with an excess of propylene oxide.

The HPS produced in accordance with the invention is eminently suitable for use as a set-up agent for gypsum and cement plaster.

The process according to the invention had not been expected to lead to a hydroxypropyl starch having a low MS-value, preferably in the range from 0.4 to 0.8, because in the known production of hydroxypropyl cellulose the use of an excess of propylene oxide in the absence of any further inert reaction medium leads to MS-values of from 3 to 5 (U.S. Pat. No. 3,278,520). Because of this, correspondingly higher MS-values had also been expected in the production of HPS by the process according to the invention.

The expression "MS-value" is explained in the following:

Each anhydroglucose unit of the cellulose or starch molecule has three OH-groups. Whereas the DS-value indicates the average number of OH-groups substituted per anhydroglucose unit, the MS-value is indicative of the average number of moles of the reactant which have been bound per anhydroglucose unit. For alkyl, caroxyalkyl or acyl derivatives of cellulose or starch, the DS- and MS-values are identical. With hydroxyalkyl derivatives of cellulose and starch, the MS-value is generally greater than the DS-value. The reason for this lies in the fact that, when a hydroxyalkyl group is introduced into the cellulose or starch molecule, an additional OH-group which is also accessible to hydroxyalkylation is formed. It follows from this that side chains of considerable length may be formed in the hydroxyalkylation of cellulose or starch. The MS:DS ration represents the average length of these side chains. It is apparent from this that the DS-value may amount to at most 3 whereas the MS value may assume considerably higher values irrespective of the extent to which the side chains were formed.

The etherification process according to the invention is generally carried out at 50° to 75° C., preferably at 60° to 70° C., in the presence of from 0.01 to 0.1 mole, preferably from 0.04 to 0.06 mole, of NaOH/mole of starch, a water content of from 10 to 20% by weight, preferably from 15 to 16% by weight, based on propylene oxide and water, and 3 to 10 moles, preferably 4 to 5 moles, of propylene oxide per mole of starch. After the reactants have been combined, they are either immediately heated to the etherification temperature and etherified for about 4 hours, or alternatively, they are first alkalised for about 1 hour at normal temperature (25° C.), subsequently heated to the etherification temperature and etherified for about 3 hours at that temperature.

Under the etherification conditions according to the invention, surprisingly only about 10 to 15% of the propylene oxide used in excess is converted into secondary products (mainly propylene glycols) so that around 75% of the propylene oxide used may be recovered and, after topping up with a suitable quantity of fresh propylene oxide, may be used for the next batch.

Neutralisation of the sodium hydroxide used may be carried out with a mineral acid or with an organic acid. By virtue of the small amount of alkali used, the salt content is minimal. For many applications the end product does not have to be purified. It is eminently suitable for use as a set-up agent for plasters, particularly gypsum plasters, from 0.005 to 0.08% and preferably from 0.02 to 0.05% of the hydroxypropyl starch produced in accordance with the invention being added to the plaster ingredients.

EXAMPLE 1

6,466 g of corn starch (moisture content 9.8%) are introduced into a 40-liter-capacity reactor, followed by the addition of 8,352 g of propylene oxide and 226 g of water. 745 g of 9.66% by weight sodium hydroxide solution are then sprayed on with uniform stirring, followed by alkalisation for one hour at room temperature. The temperature is then increased to 70° C. and kept at that level for three hours. A pressure of from 2 to 2.5 bars is established. On completion of etherification, 97.4 g of 85% by weight formic acid are introduced under pressure into the reactor to neutralise the alkali. Excess propylene oxide is then removed and collected in a cooled collecting vessel. 6,500 g of propylene oxide are recovered and, after the addition of 1,852 g of fresh propylene oxide, are used for the next batch. The product has a molar substitution degree (MS) of 0.76.

EXAMPLE 2

6.466 g of corn starch (moisture content 9.8%) are introduced into a reactor, followed by the addition of 8,352 g of propylene oxide, consisting of 6,500 g of recovered propylene oxide and 1,852 g of fresh propylene oxide (cf. Example 1), and 226 g of water. 745 g of 9.66% by weight NaOH are sprayed on with uniform stirring, followed by alkalisation for one hour at room temperature. The temperature is then increased to 70° C. and kept at that level for three hours. On completion of etherification, the alkali is neutralised in the same way as in Example 1. Excess propylene oxide is removed and again collected in a cooled receiver. The product has a molar substitution degree of 0.57.

COMPARISON EXAMPLE 3

3,232.8 g of corn starch (moisture content of 9.8%) 2,320 g of isopropanol and 2,240 g of water are introduced into the reactor. 288 g of 50% by weight NaOH are sprayed on with uniform stirring, followed by alkalisation for one hour at room temperature. On completion of alkalisation, another 15,400 g of isopropanol and 5,200 g of propylene oxide are added. The temperature is then increased to 63° C. and kept at that level for three hours. On completion of etherification, 194.8 g of 85% formic acid are introduced under pressure into the autoclave to neutralise the alkali. The autoclave is then cooled, the reaction product is separated off from the isopropanol and dried at room temperature. The product has an MS-value of 0.43. Test as set-up agent:

A gypsum plaster mix of 70 g of plaster of Paris, 26 g of lime sand, 3.7 g of calcium hydroxide and 0.25 g of methyl cellulose is mixed with 0.05 g of hydroxypropyl starch in a beaker, followed by the addition of 39 g of water and stirring with a wooden spatula.

The test is carried out by an expert using for comparison a mix which does not contain any hydroxypropyl starch as set-up agent. The time which it takes the mix to thicken appreciably is measured in seconds. The degree of thickening is qualitatively determined by the resistance to stirring. The stability of thickening is tested by continuing stirring for a prolonged period (at least 15 minutes).

Gypsum plaster mixes containing additions of 0.05 g of the hydroxypropyl starch of Examples 1 and 2 thicken quickly (in 10 seconds) and show a good thickening effect and very high stability, i.e. the resistance to stirring decreases only slightly over a period of 15 minutes. The comparison mix containing 0.05 g of the hydroxypropyl starch of Example 3 has such poor thickening effect that the product is unsuitable for use as a set-up agent.

We claim:

1. A process for the production of hydroxypropyl starch having a molar substitution degree of 0.4 to 0.8, said process comprising etherifying starch in the presence of water with an excess of propylene oxide, the water content, based on propylene oxide and water, being 10–20%, by weight, and the amount of propylene oxide present being 3–10 moles per mole of starch.

2. A process as claimed in claim 1, wherein the reaction temperature is from 50° to 75° C.

3. A process as claimed in claim 1, wherein the reaction is carried out in the presence of from 0.01 to 0.1 mole of NaOH per mole of starch.

4. A process as claimed in claim 1, wherein the water content is from 15 to 16% by weight and the amount of propylene oxide present is 4 to 5 moles.

5. A process as claimed in claim 1, wherein the starch is first alkalised at room temperature and then heated to 50° to 75° C.

* * * * *